United States Patent
Ahn et al.

(10) Patent No.: US 11,743,873 B2
(45) Date of Patent: *Aug. 29, 2023

(54) WIRELESS COMMUNICATION METHOD AND WIRELESS COMMUNICATION TERMINAL, WHICH USE NETWORK ALLOCATION VECTOR

(71) Applicants: WILUS INSTITUTE OF STANDARDS AND TECHNOLOGY INC., Gyeonggi-do (KR); SK TELECOM CO., LTD., Seoul (KR)

(72) Inventors: Jinsoo Ahn, Seoul (KR); Yongho Kim, Incheon (KR); Jinsam Kwak, Gyeonggi-do (KR); Juhyung Son, Gyeonggi-do (KR)

(73) Assignees: WILUS INSTITUTE OF STANDARDS AND TECHNOLOGY INC., Gyeonggi-Do (KR); SK TELECOM CO., LTD., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/985,644

(22) Filed: Nov. 11, 2022

(65) Prior Publication Data
US 2023/0075441 A1 Mar. 9, 2023

Related U.S. Application Data

(63) Continuation of application No. 17/579,594, filed on Jan. 20, 2022, now Pat. No. 11,523,390, which is a (Continued)

(30) Foreign Application Priority Data

Sep. 2, 2015 (KR) .................. 10-2015-0124517
Jan. 4, 2016 (KR) .................. 10-2016-0000704
Apr. 11, 2016 (KR) .................. 10-2016-0044464

(51) Int. Cl.
*H04W 72/04* (2023.01)
*H04L 27/26* (2006.01)
(Continued)

(52) U.S. Cl.
CPC ....... *H04W 72/0446* (2013.01); *H04L 5/0094* (2013.01); *H04L 5/0096* (2013.01);
(Continued)

(58) Field of Classification Search
CPC . H04W 84/12; H04W 74/0808; H04W 48/16; H04W 72/0406; H04W 72/121;
(Continued)

(56) References Cited

U.S. PATENT DOCUMENTS

2016/0143026 A1\* 5/2016 Seok ............... H04L 1/0009
370/329
2016/0330788 A1\* 11/2016 Zheng ............ H04W 28/0205
(Continued)

FOREIGN PATENT DOCUMENTS

JP 2004-535695 11/2004
KR 10-1144543 5/2012
(Continued)

OTHER PUBLICATIONS

International Search Report for PCT/KR2016/009836 dated Dec. 15, 2016 and its English translation from WIPO (published as WO 2017/039377).
(Continued)

*Primary Examiner* — Awet Haile
(74) *Attorney, Agent, or Firm* — Ladas & Parry, LLP

(57) ABSTRACT

Provided is a wireless communication terminal. The processor is configured to receive, from a base wireless communication terminal through the transceiver, a first frame including first information indicating a duration required for a pending frame exchange sequence and second information
(Continued)

indicating a frequency band which is allocated for transmission of a second frame, wherein the pending frame exchange sequence is a transmission sequence between one or more wireless communication terminals, set a network allocation vector (NAV) according to the first information indicating the duration for the pending frame exchange sequence, and reset the NAV when the wireless communication terminal does not receive a PLCP Protocol Data Unit (PPDU) for a reference time from a time point at which the first frame is received.

14 Claims, 12 Drawing Sheets

Related U.S. Application Data continuation of application No. 16/777,558, filed on Jan. 30, 2020, now Pat. No. 11,259,298, which is a continuation of application No. 15/908,563, filed on Feb. 28, 2018, now Pat. No. 10,588,128, which is a continuation of application No. PCT/KR2016/009836, filed on Sep. 2, 2016.

(51) Int. Cl.
*H04W 84/12* (2009.01)
*H04L 5/00* (2006.01)
*H04W 74/08* (2009.01)
*H04W 72/0446* (2023.01)
*H04W 72/0453* (2023.01)

(52) U.S. Cl.
CPC ......... *H04L 27/26* (2013.01); *H04W 72/0453* (2013.01); *H04W 74/0816* (2013.01); *H04W 84/12* (2013.01)

(58) Field of Classification Search
CPC ... H04W 74/002; H04W 74/04; H04W 74/08; H04W 88/08; H04W 72/0446; H04W 72/0453; H04W 24/02; H04W 88/085; H04L 5/0055; H04L 5/0094; H04L 5/0096

See application file for complete search history.

(56) References Cited

U.S. PATENT DOCUMENTS

| 2016/0360443 | A1* | 12/2016 | Hedayat | H04W 74/006 |
| 2017/0055290 | A1* | 2/2017 | Lv | H04W 74/0816 |
| 2017/0181164 | A1* | 6/2017 | Tandai | H01Q 1/243 |
| 2017/0295560 | A1* | 10/2017 | Kim | H04L 5/0055 |
| 2018/0192421 | A1 | 7/2018 | Ahn et al. | |
| 2018/0213558 | A1* | 7/2018 | Kim | H04W 74/08 |
| 2020/0170013 | A1 | 5/2020 | Ahn et al. | |
| 2022/0150890 | A1 | 5/2022 | Ahn et al. | |

FOREIGN PATENT DOCUMENTS

| KR | 10-2014-0113599 | 9/2014 |
| KR | 10-2015-0070122 | 6/2015 |
| WO | 2015/068968 | 5/2015 |
| WO | 2017/039377 | 3/2017 |

OTHER PUBLICATIONS

Written Opinion of the International Searching Authority for PCT/KR2016/009836 dated Dec. 15, 2016 and its English machine translation by WIPO (published as WO 2017/039377).
International Preliminary Report on Patentability (Chapter I) for PCT/KR2016/009836 dated Mar. 6, 2018 and its English translation from WIPO.
Non-Final Office Action dated Jul. 10, 2019 for U.S. Appl. No. 15/908,563 (now published as 2018/0192421 ).
Notice of Allowance dated Nov. 14, 2019 for U.S. Appl. No. 15/908,563 (now published as 2018/0192421).
Notice of Allowance dated Oct. 15, 2021 for U.S. Appl. No. 16/777,558 (now published as 2020/0170013).
Notice of Allowance dated Sep. 9, 2022 for U.S. Appl. No. 17/579,594 (now published as 2022/0150890).

* cited by examiner

WIRELESS COMMUNICATION METHOD AND WIRELESS COMMUNICATION TERMINAL, WHICH USE NETWORK ALLOCATION VECTOR

CROSS-REFERENCE TO RELATED APPLICATIONS

This application is a continuation of U.S. patent application Ser. No. 17/579,594 filed on Jan. 20, 2022, which is a continuation of U.S. patent application Ser. No. 16/777,558 filed on Jan. 30, 2020, now issued as U.S. Pat. No. 11,259,298 dated Feb. 22, 2022, which is a continuation of U.S. patent application Ser. No. 15/908,563 filed on Feb. 28, 2018, issued as U.S. Pat. No. 10,588,128 dated Mar. 10, 2020, which is a continuation of International Patent Application No. PCT/KR2016/009836 filed on Sep. 2, 2016, which claims the priority to Korean Patent Application No. 10-2015-0124517 filed in the Korean Intellectual Property Office on Sep. 2, 2015, Korean Patent Application No. 10-2016-0000704 filed in the Korean Intellectual Property Office on Jan. 4, 2016, and Korean Patent Application No. 10-2016-0044464 filed in the Korean Intellectual Property Office on Apr. 11, 2016, the entire contents of which are incorporated herein by reference.

TECHNICAL FIELD

The present invention relates to a wireless communication method using trigger information and a wireless communication terminal.

BACKGROUND ART

In recent years, with supply expansion of mobile apparatuses, a wireless communication technology that can provide a rapid wireless Internet service to the mobile apparatuses has been significantly spotlighted. The wireless communication technology allows mobile apparatuses including a smart phone, a smart pad, a laptop computer, a portable multimedia player, an embedded apparatus, and the like to wirelessly access the Internet in home or a company or a specific service providing area.

One of most famous wireless communication technology is wireless LAN technology. Institute of Electrical and Electronics Engineers (IEEE) 802.11 has commercialized or developed various technological standards since an initial wireless LAN technology is supported using frequencies of 2.4 GHz. First, the IEEE 802.11b supports a communication speed of a maximum of 11 Mbps while using frequencies of a 2.4 GHz band. IEEE 802.11a which is commercialized after the IEEE 802.11b uses frequencies of not the 2.4 GHz band but a 5 GHz band to reduce an influence by interference as compared with the frequencies of the 2.4 GHz band which are significantly congested and improves the communication speed up to a maximum of 54 Mbps by using an Orthogonal Frequency Division Multiplexing (OFDM) technology. However, the IEEE 802.11a has a disadvantage in that a communication distance is shorter than the IEEE 802.11b. In addition, IEEE 802.11g uses the frequencies of the 2.4 GHz band similarly to the IEEE 802.11b to implement the communication speed of a maximum of 54 Mbps and satisfies backward compatibility to significantly come into the spotlight and further, is superior to the IEEE 802.11a in terms of the communication distance.

Moreover, as a technology standard established to overcome a limitation of the communication speed which is pointed out as a weak point in a wireless LAN, IEEE 802.11n has been provided. The IEEE 802.11n aims at increasing the speed and reliability of a network and extending an operating distance of a wireless network. In more detail, the IEEE 802.11n supports a high throughput (HT) in which a data processing speed is a maximum of 540 Mbps or more and further, is based on a multiple inputs and multiple outputs (MIMO) technology in which multiple antennas are used at both sides of a transmitting unit and a receiving unit in order to minimize a transmission error and optimize a data speed. Further, the standard can use a coding scheme that transmits multiple copies which overlap with each other in order to increase data reliability.

As the supply of the wireless LAN is activated and further, applications using the wireless LAN are diversified, the need for new wireless LAN systems for supporting a higher throughput (very high throughput (VHT)) than the data processing speed supported by the IEEE 802.11n has come into the spotlight. Among them, IEEE 802.11ac supports a wide bandwidth (80 to 160 MHz) in the 5 GHz frequencies. The IEEE 802.11ac standard is defined only in the 5 GHz band, but initial 11ac chipsets will support even operations in the 2.4 GHz band for the backward compatibility with the existing 2.4 GHz band products. Theoretically, according to the standard, wireless LAN speeds of multiple stations are enabled up to a minimum of 1 Gbps and a maximum single link speed is enabled up to a minimum of 500 Mbps. This is achieved by extending concepts of a wireless interface accepted by 802.11n, such as a wider wireless frequency bandwidth (a maximum of 160 MHz), more MIMO spatial streams (a maximum of 8), multi-user MIMO, and high-density modulation (a maximum of 256 QAM). Further, as a scheme that transmits data by using a 60 GHz band instead of the existing 2.4 GHz/5 GHz, IEEE 802.11ad has been provided. The IEEE 802.11ad is a transmission standard that provides a speed of a maximum of 7 Gbps by using a beamforming technology and is suitable for high bit rate moving picture streaming such as massive data or non-compression HD video. However, since it is difficult for the 60 GHz frequency band to pass through an obstacle, it is disadvantageous in that the 60 GHz frequency band can be used only among devices in a short-distance space.

Meanwhile, in recent years, as next-generation wireless communication technology standards after the 802.11ac and 802.11ad, discussion for providing a high-efficiency and high-performance wireless communication technology in a high-density environment is continuously performed. That is, in a next-generation wireless communication technology environment, communication having high frequency efficiency needs to be provided indoors/outdoors under the presence of high-density terminals and base terminals and various technologies for implementing the communication are required.

Especially, as the number of devices using a wireless communication technology increases, it is necessary to efficiently use a predetermined channel. Therefore, required is a technology capable of efficiently using bandwidths by simultaneously transmitting data between a plurality of terminals and base terminals.

DISCLOSURE

Technical Problem

An object of the present invention is to provide an efficient wireless communication method and wireless communication terminal using a network allocation vector.

Especially, an object of the present invention is to provide a wireless communication method and a wireless communication terminal that support communication with a plurality of wireless communication terminals using a network allocation vector.

Technical Solution

According to an embodiment of the present invention, a wireless communication terminal includes a transceiver; and a processor. The processor is configured to receive, from a base wireless communication terminal through the transceiver, a first frame including first information indicating a duration required for a pending frame exchange sequence and second information indicating a frequency band which is allocated for transmission of a second frame, wherein the pending frame exchange sequence is a transmission sequence between one or more wireless communication terminals, set a network allocation vector (NAV) according to the first information indicating the duration for the pending frame exchange sequence, and reset the NAV when the wireless communication terminal does not receive a PLCP Protocol Data Unit (PPDU) for a reference time from a time point at which the first frame is received. The reference time may be determined based on a time required to transmit the second frame. The second frame may be a response to the first frame. In addition, the one or more wireless communication terminals may be a plurality of wireless communication terminals. Further more, the one or more wireless communication terminals may be one or more wireless communication terminals other than the wireless communication terminal.

The processor may be configured to determine the reference time on a Modulation & Coding Scheme (MCS) with which the second frame is transmitted.

The wireless communication terminal of claim 2, wherein the MCS with which the second frame is transmitted is the most robust MCS usable for a transmission of a PPDU including the second frame.

The MCS with which the second frame is transmitted may be MCS0 defined in IEEE 802.11 standard.

The reference time may be determined by a following equation, $$T_{ref}=(2 \times aSIFSTime)+(SecondFrame\_Time)+aPHY\text{-}RX\text{-}START\text{-}Delay+(2 \times aSlotTime)$$

where $T_{ref}$ denotes the reference time, where aSIFSTime denotes a time of the Short Inter-Frame Space (SIFS) defined in the IEEE 802.11 standard, where SecondFrame_Time denotes a duration required for transmission of the second frame which is transmitted by MCS0, where aPHY-RX-START-Delay denotes a time from a start time point of the preamble until the RX-START.indication is issued in a physical layer of the wireless communication terminal, aSlotTime denotes a Slot Time defined in the IEEE 802.11 standard.

The first frame may include third information indicates identifiers of the one or more the wireless communication terminal. In this case, the processor may be configured to reset the NAV when the third information does not indicate the wireless communication terminal.

The processor may be configured to reset the NAV when the wireless communication terminal receives a third frame from the base wireless communication terminal.

The processor may be configured to participate in a channel contention procedure after at a time the NAV is reset.

According to an embodiment of the present invention, an operation method of a wireless communication terminal, the method includes receiving, from a base wireless communication terminal through the transceiver, a first frame including first information indicating a duration required for a pending frame exchange sequence and second information indicating a frequency band which is allocated for transmission of a second frame, wherein the pending frame exchange sequence is a transmission sequence between one or more wireless communication terminals other than the wireless communication terminal, and the base wireless communication terminal, setting a network allocation vector (NAV) according to the first information indicating the duration for the pending frame exchange sequence, and resetting the NAV when the wireless communication terminal does not receive a PLCP Protocol Data Unit (PPDU) for a reference time from a time point at which the first frame is received. The reference time may be determined based on a time required to transmit the second frame. The second frame may be a response to the first frame. In addition, the one or more wireless communication terminals may be a plurality of wireless communication terminals. Further more, the one or more wireless communication terminals may be one or more wireless communication terminals other than the wireless communication terminal.

The resetting the NAV may include determining the reference time on a Modulation & Coding Scheme (MCS) with which the second frame is transmitted.

The MCS may be the most robust MCS usable for a transmission of a PPDU including the second frame.

The MCS may be MCS0 defined in IEEE 802.11 standard.

The reference time may be determined by a following equation, $$T_{ref}=(2 \times aSIFSTime)+(SecondFrame\_Time)+aPHY\text{-}RX\text{-}START\text{-}Delay+(2 \times aSlotTime)$$

where $T_{ref}$ denotes the reference time, where aSIFSTime denotes a time of the Short Inter-Frame Space (SIFS) defined in the IEEE 802.11 standard, where SecondFrame_Time denotes a duration required for transmission of the second frame which is transmitted by MCS0, where aPHY-RX-START-Delay denotes a time from a start time point of the preamble until the RX-START.indication is issued in a physical layer of the wireless communication terminal, aSlotTime denotes a Slot Time defined in the IEEE 802.11 standard.

The first frame may include third information indicates identifier of the one or more the wireless communication terminal. In this case, the resetting the NAV may include resetting the NAV when the third information does not indicate the wireless communication terminal.

The resetting the NAV may include resetting when the wireless communication terminal receives a third frame from the base wireless communication terminal.

The method may further include participating in a channel contention procedure after at a time the NAV is reset.

Advantageous Effects

An embodiment of the present invention provides an efficient wireless communication method and wireless communication terminal using a network allocation vector.

Especially, an embodiment of the present invention provides a wireless communication method and a wireless communication terminal that support communication with a plurality of wireless communication terminals using a network allocation vector.

MODE FOR CARRYING OUT THE INVENTION

Figure 1:
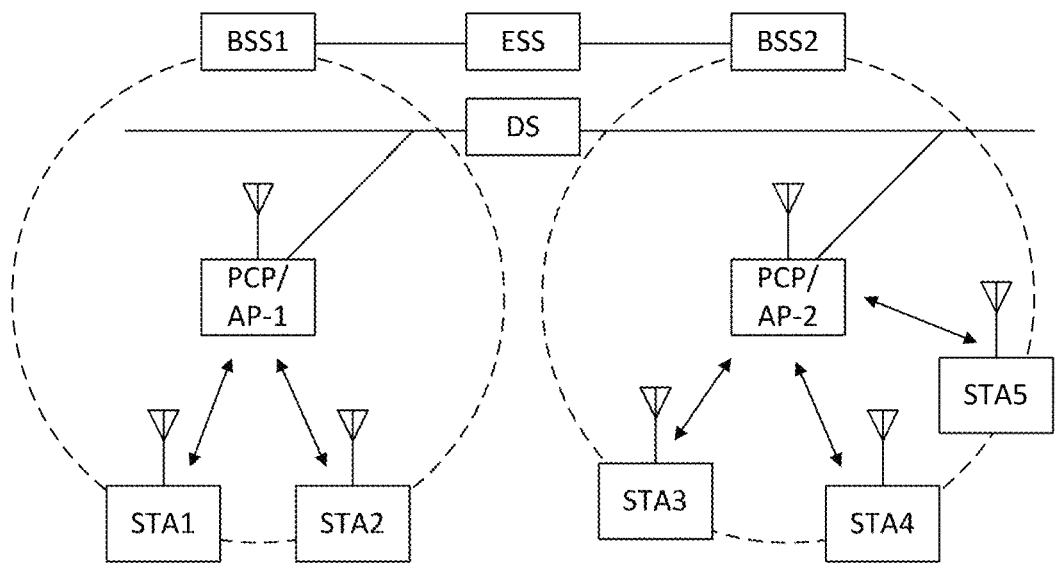
FIG. 1 shows a wireless LAN system according to an embodiment of the present invention.

Preferred embodiments of the present invention will be described below in more detail with reference to the accompanying drawings. The present invention may, however, be embodied in different forms and should not be constructed as limited to the embodiments set forth herein. Parts not relating to description are omitted in the drawings in order to clearly describe the present invention and like reference numerals refer to like elements throughout.

Furthermore, when it is described that one comprises (or includes or has) some elements, it should be understood that it may comprise (or include or has) only those elements, or it may comprise (or include or have) other elements as well as those elements if there is no specific limitation.

This application claims priority to and the benefit of Korean Patent Application Nos. 10-2015-0124517 (2015 Sep. 2), Nos. 10-2016-0000704 (2016 Jan. 4), and Nos. 10-2016-0044464 (2016 Apr. 11) filed in the Korean Intellectual Property Office and the embodiments and mentioned items described in the respective applications are included in the Detailed Description of the present application.

FIG. 1 is a diagram illustrating a wireless communication system according to an embodiment of the present invention. For convenience of description, an embodiment of the present invention is described through the wireless LAN system. The wireless LAN system includes one or more basic service sets (BSS) and the BSS represents a set of apparatuses which are successfully synchronized with each other to communicate with each other. In general, the BSS may be classified into an infrastructure BSS and an independent BSS (IBSS) and FIG. 1 illustrates the infrastructure BSS between them.

As illustrated in FIG. 1, the infrastructure BSS (BSS1 and BSS2) includes one or more stations STA1, STA2, STA3, STA4, and STA5, access points PCP/AP-1 and PCP/AP-2 which are stations providing a distribution service, and a distribution system (DS) connecting the multiple access points PCP/AP-1 and PCP/AP-2.

The station (STA) is a predetermined device including medium access control (MAC) following a regulation of an IEEE 802.11 standard and a physical layer interface for a wireless medium, and includes both a non-access point (non-AP) station and an access point (AP) in a broad sense. Further, in the present specification, a term 'terminal' may be used to refer to a concept including a wireless LAN communication device such as non-AP STA, or an AP, or both terms. A station for wireless communication includes a processor and a transceiver and according to the embodiment, may further include a user interface unit and a display unit. The processor may generate a frame to be transmitted through a wireless network or process a frame received through the wireless network and besides, perform various processing for controlling the station. In addition, the transceiver is functionally connected with the processor and transmits and receives frames through the wireless network for the station.

The access point (AP) is an entity that provides access to the distribution system (DS) via wireless medium for the station associated therewith. In the infrastructure BSS, communication among non-AP stations is, in principle, performed via the AP, but when a direct link is configured, direct communication is enabled even among the non-AP stations. Meanwhile, in the present invention, the AP is used as a concept including a personal BSS coordination point (PCP) and may include concepts including a centralized controller, a base station (BS), a node-B, a base transceiver system (BTS), and a site controller in a broad sense.

A plurality of infrastructure BSSs may be connected with each other through the distribution system (DS). In this case, a plurality of BSSs connected through the distribution system is referred to as an extended service set (ESS).

Figure 2:
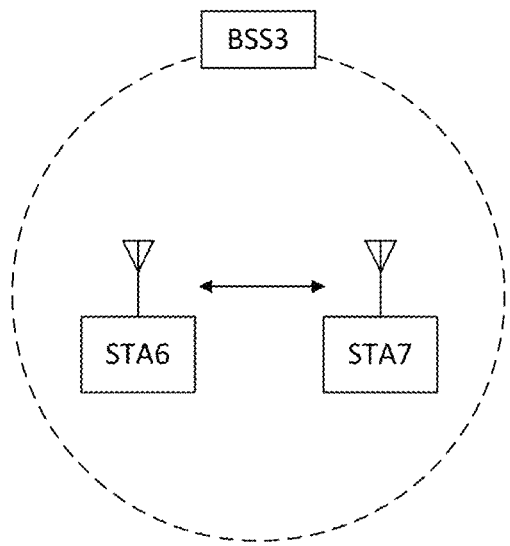
FIG. 2 shows a wireless LAN system according to another embodiment of the present invention.

FIG. 2 illustrates an independent BSS which is a wireless communication system according to another embodiment of the present invention. For convenience of description, another embodiment of the present invention is described through the wireless LAN system. In the embodiment of FIG. 2, duplicative description of parts, which are the same as or correspond to the embodiment of FIG. 1, will be omitted.

Since a BSS3 illustrated in FIG. 2 is the independent BSS and does not include the AP, all stations STA6 and STA7 are not connected with the AP. The independent BSS is not permitted to access the distribution system and forms a self-contained network. In the independent BSS, the respective stations STA6 and STA7 may be directly connected with each other.

Figure 3:
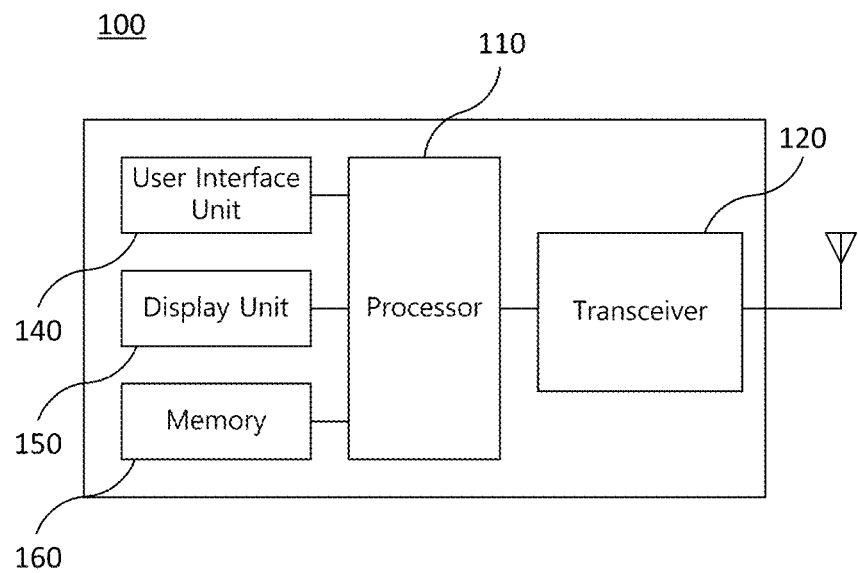
FIG. 3 shows a block diagram illustrating a configuration of a station according to an embodiment of the inventive concept.

FIG. 3 is a block diagram illustrating a configuration of a station 100 according to an embodiment of the present invention.

As illustrated in FIG. 3, the station 100 according to the embodiment of the present invention may include a processor 110, a transceiver 120, a user interface unit 140, a display unit 150, and a memory 160.

First, the transceiver 120 transmits and receives a wireless signal such as a wireless LAN physical layer frame, or the like and may be embedded in the station 100 or provided as an exterior. According to the embodiment, the transceiver 120 may include at least one transmit and receive module using different frequency bands. For example, the transceiver 120 may include transmit and receive modules having different frequency bands such as 2.4 GHz, 5 GHz, and 60 GHz. According to an embodiment, the station 100 may include a transmit and receive module using a frequency band of 6 GHz or more and a transmit and receive module using a frequency band of 6 GHz or less. The respective transmit and receive modules may perform wireless communication with the AP or an external station according to a wireless LAN standard of a frequency band supported by the corresponding transmit and receive module. The transceiver 120 may operate only one transmit and receive module at a time or simultaneously operate multiple transmit and receive modules together according to the performance and requirements of the station 100. When the station 100 includes a plurality of transmit and receive modules, each transmit and receive module may be implemented by independent elements or a plurality of modules may be integrated into one chip.

Next, the user interface unit 140 includes various types of input/output means provided in the station 100. That is, the user interface unit 140 may receive a user input by using various input means and the processor 110 may control the station 100 based on the received user input. Further, the user interface unit 140 may perform output based on a command of the processor 110 by using various output means.

Next, the display unit 150 outputs an image on a display screen. The display unit 150 may output various display objects such as contents executed by the processor 110 or a user interface based on a control command of the processor 110, and the like. Further, the memory 160 stores a control program used in the station 100 and various resulting data. The control program may include an access program required for the station 100 to access the AP or the external station.

The processor 110 of the present invention may execute various commands or programs and process data in the station 100. Further, the processor 110 may control the respective units of the station 100 and control data transmission/reception among the units. According to the embodiment of the present invention, the processor 110 may execute the program for accessing the AP stored in the memory 160 and receive a communication configuration message transmitted by the AP. Further, the processor 110 may read information on a priority condition of the station 100 included in the communication configuration message and request the access to the AP based on the information on the priority condition of the station 100. The processor 110 of the present invention may represent a main control unit of the station 100 and according to the embodiment, the processor 110 may represent a control unit for individually controlling some component of the station 100, for example, the transceiver 120, and the like. The processor 110 may be a modulator and/or demodulator which modulates wireless signal transmitted to the transceiver 120 and demodulates wireless signal received from the transceiver 120. The processor 110 controls various operations of wireless signal transmission/reception of the station 100 according to the embodiment of the present invention. A detailed embodiment thereof will be described below.

The station 100 illustrated in FIG. 3 is a block diagram according to an embodiment of the present invention, where separate blocks are illustrated as logically distinguished elements of the device. Accordingly, the elements of the device may be mounted in a single chip or multiple chips depending on design of the device. For example, the processor 110 and the transceiver 120 may be implemented while being integrated into a single chip or implemented as a separate chip. Further, in the embodiment of the present invention, some components of the station 100, for example, the user interface unit 140 and the display unit 150 may be optionally provided in the station 100.

Figure 4:
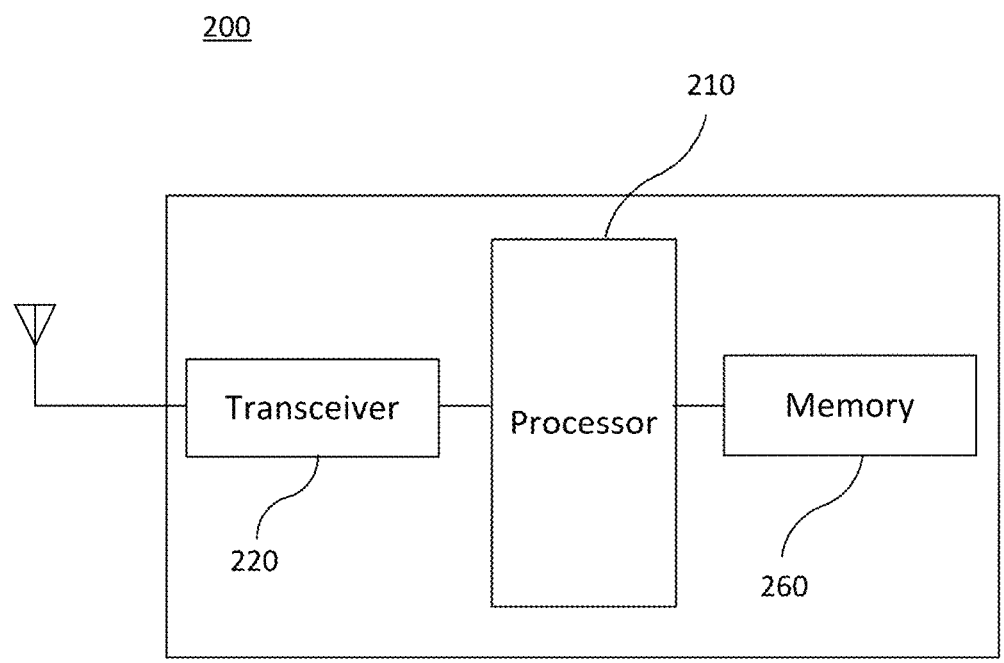
FIG. 4 shows a block diagram illustrating a configuration of an access point according to an embodiment of the present invention.

FIG. 4 is a block diagram illustrating a configuration of an AP 200 according to an embodiment of the present invention.

As illustrated in FIG. 4, the AP 200 according to the embodiment of the present invention may include a processor 210, a transceiver 220, and a memory 260. In FIG. 4, among the components of the AP 200, duplicative description of parts which are the same as or correspond to the components of the station 100 of FIG. 2 will be omitted.

Referring to FIG. 4, the AP 200 according to the present invention includes the transceiver 220 for operating the BSS in at least one frequency band. As described in the embodiment of FIG. 3, the transceiver 220 of the AP 200 may also include a plurality of transmit and receive modules using different frequency bands. That is, the AP 200 according to the embodiment of the present invention may include two or more transmit and receive modules among different frequency bands, for example, 2.4 GHz, 5 GHz, and 60 GHz together. Preferably, the AP 200 may include a transmit and receive module using a frequency band of 6 GHz or more and a transmit and receive module using a frequency band of 6 GHz or less. The respective transmit and receive modules may perform wireless communication with the station according to a wireless LAN standard of a frequency band supported by the corresponding transmit and receive module. The transceiver 220 may operate only one transmit and receive module at a time or simultaneously operate multiple transmit and receive modules together according to the performance and requirements of the AP 200.

Next, the memory 260 stores a control program used in the AP 200 and various resulting data. The control program may include an access program for managing the access of the station. Further, the processor 210 may control the respective units of the AP 200 and control data transmission/reception among the units. According to the embodiment of the present invention, the processor 210 may execute the program for accessing the station stored in the memory 260 and transmit communication configuration messages for one or more stations. In this case, the communication configuration messages may include information about access priority conditions of the respective stations. Further, the processor 210 performs an access configuration according to an access request of the station. The processor 210 may be a modulator and/or demodulator which modulates wireless signal transmitted to the transceiver 220 and demodulates wireless signal received from the transceiver 220. The processor 210 controls various operations such as radio signal transmission/reception of the AP 200 according to the embodiment of the present invention. A detailed embodiment thereof will be described below.

Figure 5:
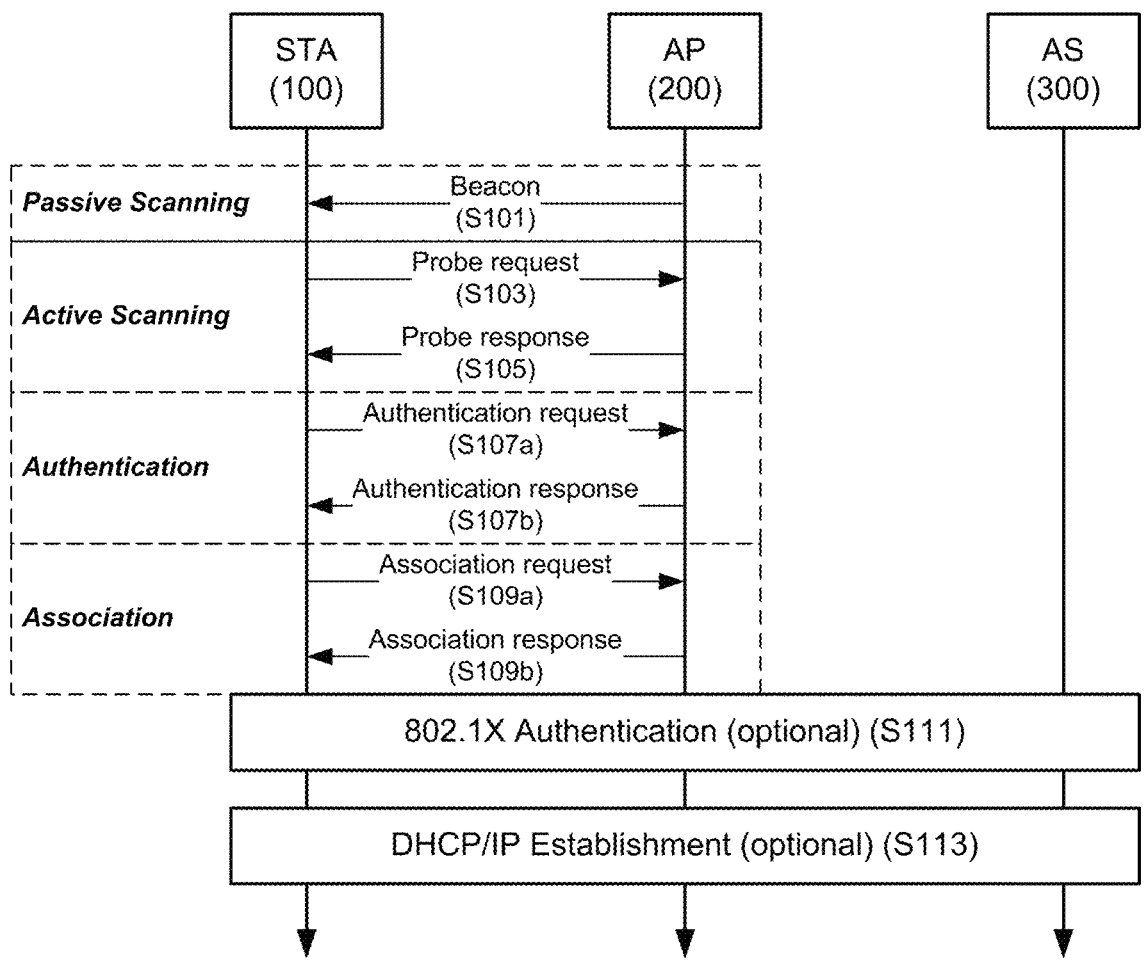
FIG. 5 shows a process that a station sets an access point and a link according to an embodiment of the present invention.

FIG. 5 is a diagram schematically illustrating a process in which a STA sets a link with an AP.

Referring to FIG. 5, the link between the STA 100 and the AP 200 is set through three steps of scanning, authentication, and association in a broad way. First, the scanning step is a step in which the STA 100 obtains access information of BSS operated by the AP 200. A method for performing the scanning includes a passive scanning method in which the AP 200 obtains information by using a beacon message (S101) which is periodically transmitted and an active scanning method in which the STA 100 transmits a probe request to the AP (S103) and obtains access information by receiving a probe response from the AP (S105).

The STA 100 that successfully receives wireless access information in the scanning step performs the authentication step by transmitting an authentication request (S107a) and receiving an authentication response from the AP 200 (S107b). After the authentication step is performed, the STA 100 performs the association step by transmitting an association request (S109a) and receiving an association response from the AP 200 (S109b).

Meanwhile, an 802.1X based authentication step (S111) and an IP address obtaining step (S113) through DHCP may be additionally performed. In FIG. 5, the authentication server 300 is a server that processes 802.1X based authentication with the STA 100 and may be present in physical association with the AP 200 or present as a separate server.

In the 802.11 standard, in order to prevent transmission collision by the hidden node, a Network Allocation Vector (NAV) of the neighboring wireless communication terminals is set by transmitting a Request To Send (RTS) frame and a Clear To Send (CTS) frame. At this time, the NAV represents the time when the wireless medium is occupied by the transmission of another wireless communication terminal. The NAV is maintained regardless of Clear Channel Assessment (CCA), and the wireless communication terminal may prevent the hidden node problem in which the wireless communication coverage of the wireless communication terminal that transmits data through the NAV and the wireless communication coverage of the wireless communication terminal that receives the data are different.

When data is transmitted using Orthogonal Frequency Division Modulation (OFDMA) or Multi Input Multi Output (MIMO), any one wireless communication terminal may transmit data to a plurality of wireless communication terminals simultaneously. Also, any one wireless communication terminal may simultaneously receive data from a plurality of wireless communication terminals. At this time, there is a problem of setting a NAV when one wireless communication terminal and a plurality of wireless communication terminals communicate with each other. A specific embodiment in which the wireless communication terminal sets the NAV will be described with reference to FIG. 6.

For convenience of description, any one wireless communication terminal that communicates simultaneously with a plurality of wireless communication terminals is referred to as a first wireless communication terminal and a plurality of wireless communication terminals that simultaneously communicate with the first wireless communication terminal are referred to as a plurality of second wireless communication terminals. Further, the first wireless communication terminal may be referred to as a base wireless communication terminal (device). In addition, the first wireless communication terminal may be a wireless communication terminal that allocates a communication medium resource and performs scheduling in communication with a plurality of wireless communication terminals. Specifically, the first wireless communication terminal may perform the role of a cell coordinator. At this time, the first wireless communication terminal may be the access point 200. In addition, the second wireless communication terminal may be the station 100 associated with the access point 200. In a specific embodiment, the first wireless communication terminal may be a wireless communication terminal that allocates a communication medium resource and performs scheduling in an independent network, such as an ad-hoc network, which is not connected to an external distribution service. In addition, the first wireless communication terminal may be at least one of a base station, an eNB, and a transmission point TP.

Figure 6:
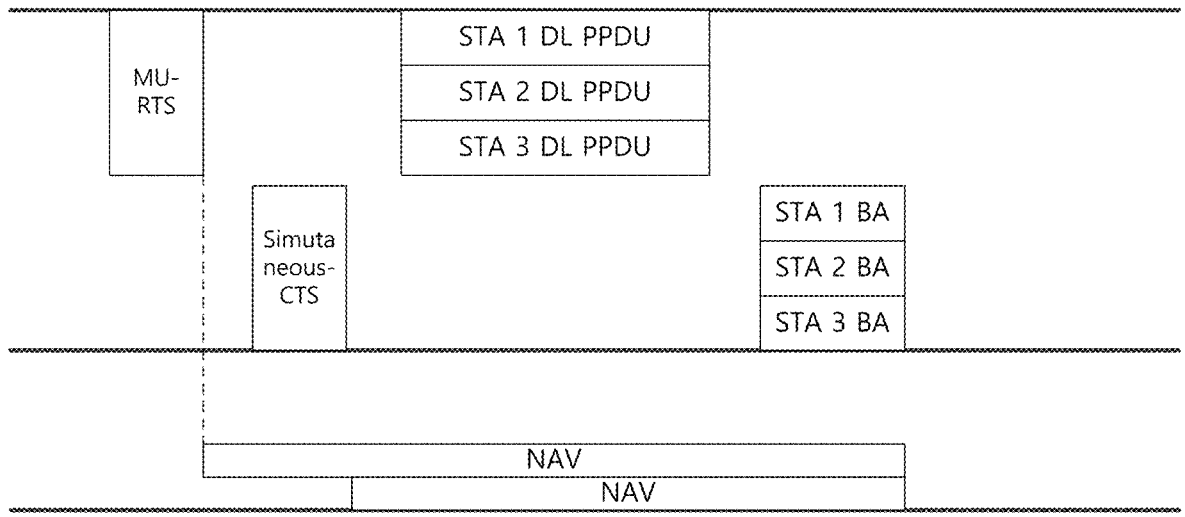
FIG. 6 shows a method in which a wireless communication terminal sets a NAV of a neighboring wireless communication terminal when one wireless communication terminal according to the embodiment of the present invention transmits data to a plurality of wireless communication terminals.

FIG. 6 shows a method in which a wireless communication terminal and a plurality of wireless communication terminals set a NAV of a neighboring wireless communication terminal when one of the wireless communication terminals according to the embodiment of the present invention transmits data to a plurality of wireless communication terminals.

In the communication between any one wireless communication terminal and another wireless communication terminal, the wireless communication terminal that is to transmit data transmits the RTS frame and the wireless communication terminal that is to receive the data transmits the CTS frame. The RTS frame and the CTS frame include a duration field indicating a duration required for the pending transmission sequence, and the neighboring wireless communication terminal receiving the RTS frame and the CTS frame sets the NAV according to the value of the duration field. At this time, the RTS frame includes a Destination Address (DA) and a Source Address (SA). In addition, the CTS frame includes a Destination Address (DA). Also, the neighboring wireless communication terminal indicates a wireless communication terminal not indicated in the destination address of the RTS frame and the CTS frame. For convenience of description, a wireless communication terminal that receives a MAC frame but is not designated in the destination address of the corresponding MAC frame is referred to as a neighboring wireless communication terminal.

When the first wireless communication terminal transmits an RTS frame for transmitting data to a plurality of second wireless communication terminals, the first wireless communication terminal need to use a new type of RTS frame capable of being transmitted to the plurality of second wireless communication terminals or transmit the RTS frame a plurality of times. Specifically, the first wireless communication terminal may transmit an MU-RTS frame including the addresses of a plurality of wireless communication terminals to the plurality of second wireless communication terminals. The MU-RTS frame may be a frame structure different from the existing RTS frame. In addition, the frame type of the MU-RTS frame may be a control. In addition, the frame type of the MU-RTS frame may be a MU-RTS. In another specific embodiment, the dependent frame type of the MU-RTS frame may be a trigger frame, and the type of the trigger frame may be MU-RTS.

At this time, the plurality of second wireless communication terminals receiving the MU-RTS frame may transmit a simultaneous CTS frame to the first wireless communication terminal. At this time, the simultaneous CTS frame represents that a plurality of wireless communication terminals include the same field value and transmit a CTS frame simultaneously through the same modulation method. In addition, the format of the simultaneous CTS frame may be the same as the format of the CTS frame used by the legacy wireless communication terminal.

In the embodiment of FIG. 6, the access point transmits an MU-RTS frame to the first station STA1 to the third station STA3. The station around the access point receiving the MU-RTS frame sets the NAV according to the duration field value of the MU-RTS frame.

The first to third stations STA1 to STA3 transmit the simultaneous CTS frame to the access point. The stations around the first station STA1 to the third station STA3 receiving the CTS frame set the NAV according to the duration field value of the CTS frame.

The access point transmits data to the first station STA1 to the third station STA3.

The first to third stations STA1 to STA3 transmit the BA frame to the access point.

When the first wireless communication terminal transmits data to the plurality of second wireless communication terminals, the transmission is started from the first wireless communication terminal. Accordingly, the first wireless communication terminal may transmit the MU-RTS frame, and the plurality of second wireless communication terminals may transmit the CTS frame in response to the MU-RTS frame. On the other hand, in order for the plurality of second wireless communication terminals to transmit data to the first wireless communication terminal, the first wireless communication terminal need to allocate radio resources to the second wireless communication terminal, and the first wireless communication terminal need to trigger the transmission of the plurality of second wireless communication terminals. Therefore, a NAV setting sequence starting from the first wireless communication terminal other than the plurality of second wireless communication terminals for transmitting data is required. This will be described with reference to FIG. 7.

Figure 7:
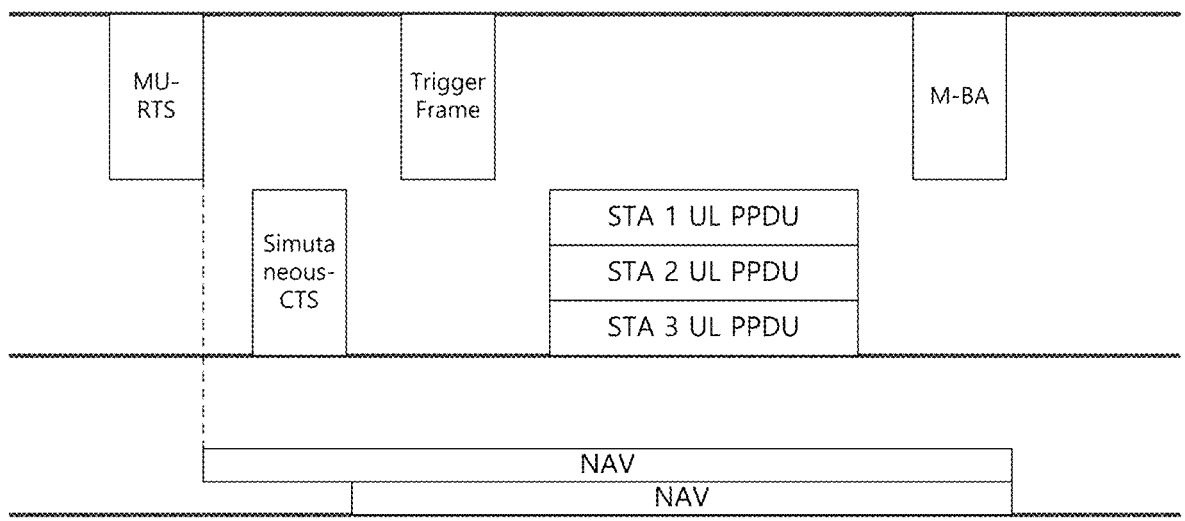
FIG. 7 shows a method in which a wireless communication terminal sets a NAV of a neighboring wireless communication terminal when a plurality of wireless communication terminals according to the embodiment of the present invention transmit data to one wireless communication terminal.

FIG. 7 shows a method in which a wireless communication terminal sets a NAV of a neighboring wireless communication terminal when a plurality of wireless communication terminals according to the embodiment of the present invention transmit data to one wireless communication terminal.

When a plurality of second wireless communication terminals transmit data to the first wireless communication terminals, the first wireless communication terminal may transmit the MU-RTS frame to the plurality of second wireless communication terminals, and a plurality of second wireless communication terminals may transmit a simultaneous CTS frame to the first wireless communication terminal to set the NAV of the neighboring wireless communication terminals.

After receiving at least one simultaneous CTS frame, the first wireless communication terminal may transmit a trigger frame for triggering the transmission for the first wireless communication terminal to the plurality of second wireless communication terminals. The trigger frame may include information on radio resources allocated to a plurality of second wireless communication terminals.

The plurality of second wireless communication terminals transmit data to the first wireless communication terminal based on the trigger frame. Specifically, the plurality of second wireless communication terminals may obtain information on radio resources allocated to each of the plurality of second wireless communication terminals from the trigger frame, and transmit data to the first wireless communication terminal through the radio resource allocated to each of the plurality of second wireless communication terminals. At this time, the information on the radio resources allocated to each of the plurality of second radio communication terminals may be information on the frequency band allocated to each of the plurality of second radio communication terminals.

In the embodiment of FIG. 7, the access point transmits an MU-RTS frame to the first station STA1 to the third station STA3. The station around the access point receiving the MU-RTS frame sets the NAV according to the duration field value of the MU-RTS frame.

The first to third stations STA1 to STA3 transmit the simultaneous CTS frame to the access point. The stations around the first station STA1 to the third station STA3 receiving the CTS frame set the NAV according to the duration field value of the CTS frame.

The access point transmits the trigger frame to the first station STA1 to the third station STA3.

The first to third stations STA1 to STA3 transmit data to the access point based on the trigger frame. Specifically, the first to third stations STA1 to STA3 obtain information on frequency bands allocated to the first to third stations STA1 to STA3 from the trigger frame, and transmit data through each of the frequency bands allocated to the first to third stations STA1 to STA3.

The access point transmits a multi-station BA (M-BA) frame to the first station STA1 to the third station STA3. At this time, the multi-station BA frame is a MAC frame indicating whether data transmitted from a plurality of stations is received or not. Specifically, the M-BA frame may be a frame format of the Multi-TID BlockACK.

As described with reference to FIGS. 6 to 7, when the first wireless communication terminal transmits the MU-RTS frame and sets the NAV, the plurality of second wireless communication terminals may not receive the MU-RTS frame, or the first wireless communication terminal may not receive the CTS frame transmitted by the plurality of second wireless communication terminals.

Figure 8:
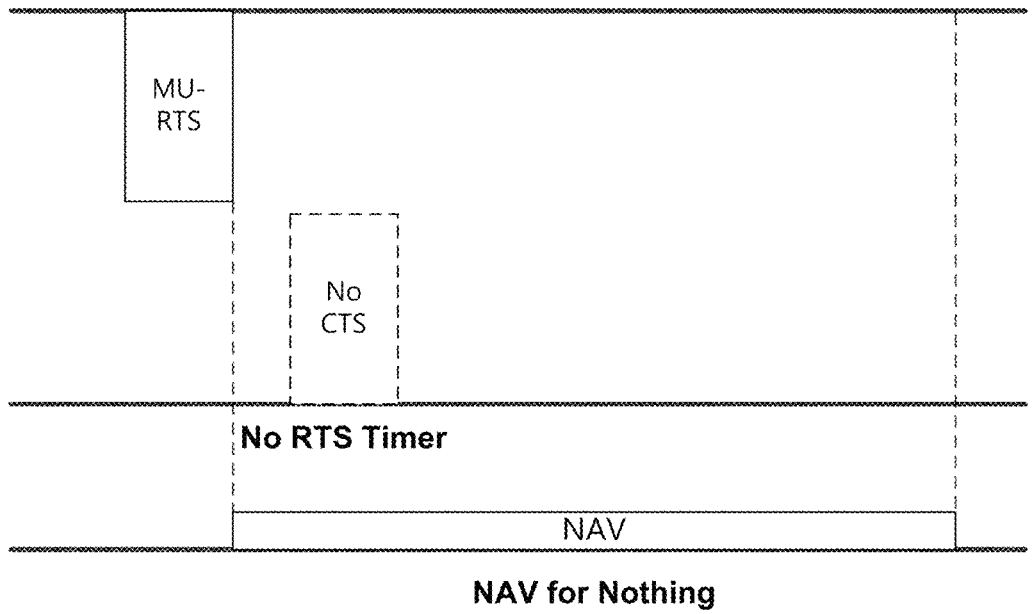
FIG. 8 shows a case where a wireless communication terminal according to an embodiment of the present invention transmits an MU-RTS and does not transmit a CTS frame.

FIG. 8 shows a case where a wireless communication terminal transmits an MU-RTS frame and a wireless communication terminal does not receive a CTS frame according to an embodiment of the present invention.

In the embodiment of FIG. 8, the access point transmits an MU-RTS frame to a plurality of stations. The wireless communication terminal around the access point that receives the MU-RTS frame sets the NAV based on the MU-RTS frame.

However, the plurality of stations fail to receive the MU-RTS frame and do not transmit the CTS frame, which is a response to the MU-RTS frame. Therefore, data transmission between the access point and the plurality of stations does not proceed any more. At this time, although the data transmission between the access point and the plurality of stations does not proceed, the station around the access point that receives the MU-RTS frame maintains the NAV set by the MU-RTS frame continuously.

In such an embodiment, even if all of the second wireless communication terminals do not receive the MU-RTS frame or the first wireless communication terminal fails to receive the CTS frame transmitted by the plurality of second wireless communication terminals, the NAV set in the neighboring wireless communication terminal through the MU-RTS frame is maintained continuously. Therefore, there is a need for a method of resetting the NAV set in the peripheral wireless communication terminal. This will be described with reference to FIGS. 9 to 15.

Figure 9:
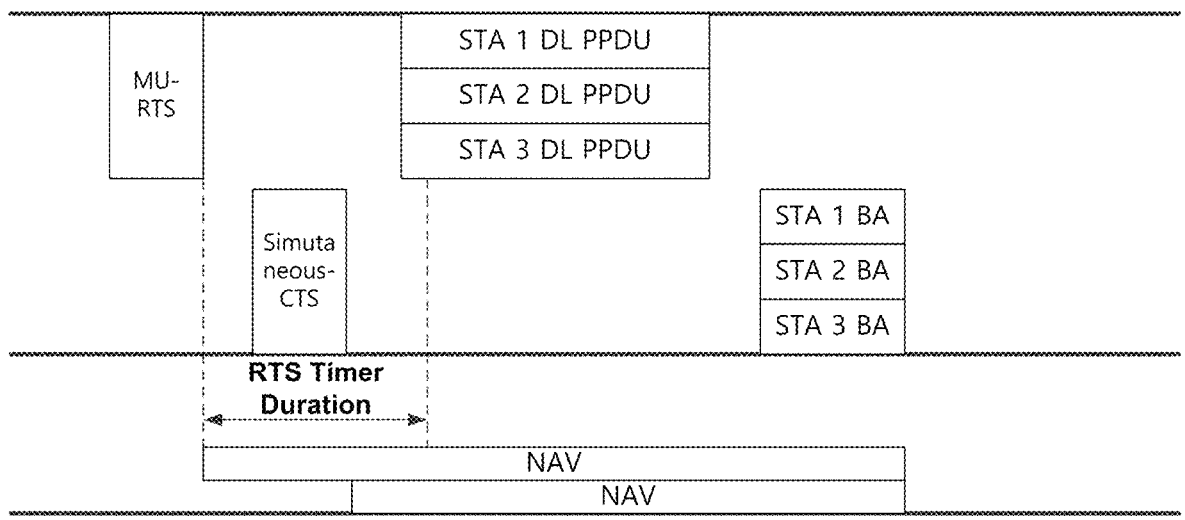
FIG. 9 shows a method of resetting a NAV when a wireless communication terminal receiving an MU-RTS fails to receive a PLCP Protocol Data Unit (PPDU) during a reference time from when the MU-RTS is received in a case where one wireless communication terminal according to the embodiment of the present invention transmits data to a plurality of wireless communication terminals.
Figure 10:
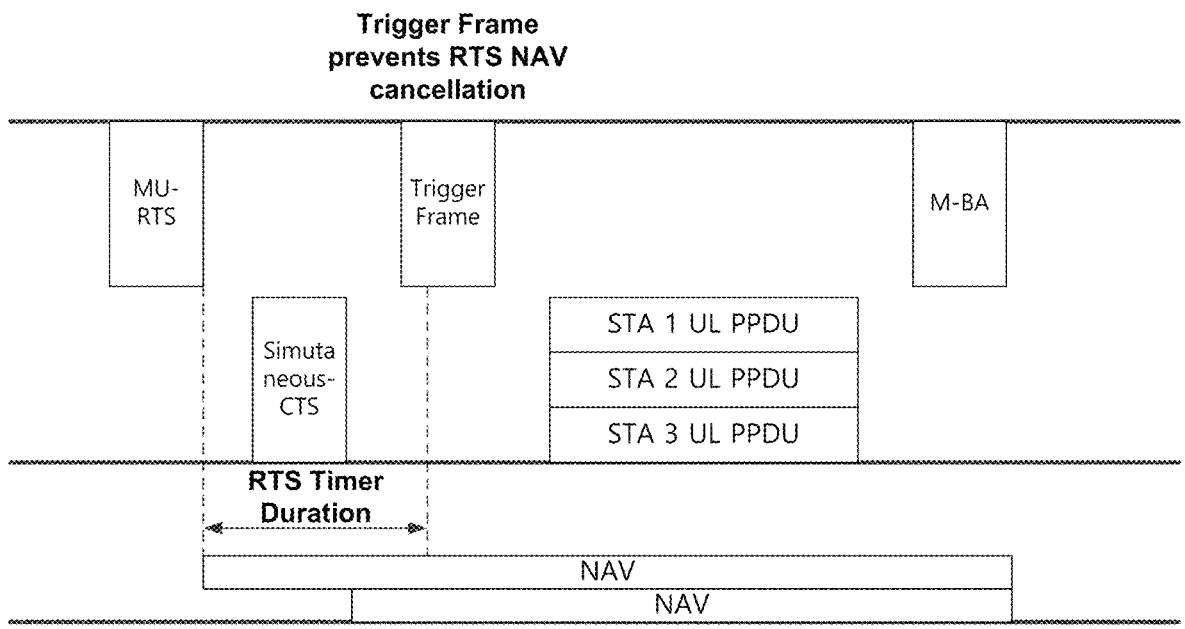
FIG. 10 shows a method of resetting a NAV when a wireless communication terminal receiving an MU-RTS fails to receive a PPDU during a reference time from when the MU-RTS is received in a case where a plurality of wireless communication terminals according to the embodiment of the present invention transmit data to one wireless communication terminal.

FIG. 9 shows a method of resetting a NAV when a wireless communication terminal receiving an MU-RTS fails to receive a PLCP Protocol Data Unit (PPDU) during a reference time from when the MU-RTS is received in a case where one wireless communication terminal according to the embodiment of the present invention transmits data to a plurality of wireless communication terminals. FIG. 10 shows a method of resetting a NAV when a wireless communication terminal receiving an MU-RTS fails to receive a PPDU during a reference time from when the MU-RTS is received in a case where a plurality of wireless communication terminals according to the embodiment of the present invention transmit data to one wireless communication terminal.

The wireless communication terminal may set the NAV to 0 when the PPDU is not received for the reference time from when the PPDU including the MU-RTS frame is received. At this time, the reference time may be (2×aSIFSTime)+(CTS_Time)+aPHY-RX-START-Delay+(n×aSlotTime). aSIFSTime represents the time of the SIFS defined in the IEEE 802.11 standard. aSlotTime represents the Slot Time defined in the IEEE 802.11 standard. CTS_Time represents the time required for CTS frame transmission. In addition, the time required for CTS frame transmission may be determined based on a Modulation & Coding Scheme (MCS) with which the CTS frame is transmitted. The CTS frame is transmitted with a MCS which may be the most robust MCS usable for a transmission of a PPDU including the CTS frame. The CTS frame is transmitted with a MCS which may be the most robust MCS usable by a plurality of wireless communication terminal receiving the MU-RTS frame. Specifically, the CTS frame may be transmitted with an MCS0 defined in IEEE 802.11. aPHY-RX-START-Delay represents the time from the start time point of the preamble until the RX-START.indication is issued in the physical layer. Also, n is a natural number. In a specific embodiment, n may be 2.

Specifically, when the wireless communication terminal fails to receive the PPDU including the simultaneous CTS frame or the CTS frame from the time of receiving the PPDU including the MU-RTS frame, the wireless communication terminal may set the NAV to zero.

In addition, the wireless communication terminal may determine whether the MAC frame included in the PPDU received through the frame type and the dependent frame type is an MU-RTS frame. Specifically, when the type of the MAC frame included in the received PPDU is the control type and the dependent frame type of the MAC frame included in the received PPDU is the MU-RTS, the wireless communication terminal may determine the MAC frame included in the received PPDU as an MU-RTS frame. In another specific embodiment, when the type of the MAC frame included in the received PPDU is the control type, the dependent frame type of the MAC frame included in the received PPDU is the trigger, and the trigger type of the MAC frame included in the received PPDU is the MU-RTS, the wireless communication terminal may determine the MAC frame included in the received PPDU as an MU-RTS frame.

In the embodiment of FIG. 9, the access point transmits an MU-RTS frame to the first station STA1 to the third station STA3. At this time, the station around the access point receiving the MU-RTS frame sets a timer having the reference time as a duration and having the PPDU reception as a release condition. If the timer expires, the station around the access point resets the NAV setting. At this time, the reference time may be (2×aSIFSTime)+(CTS_Time)+aPHY-RX-START-Delay+(n×aSlotTime) described above. Also, the release condition may be a PPDU reception including a CTS frame that is a response to an MU-RTS frame.

The access point receives simultaneous CTS frames from the first station STA1 to the third station STA3 and transmits data to the first station STA1 to the third station STA3. At this time, the station around the access point receiving the MU-RTS frame releases the timer based on the data transmission of the access point. Therefore, the NAV setting of the station around the access point that receives the MU-RTS frame is maintained.

In the embodiment of FIG. 10, the access point transmits an MU-RTS frame to the first station STA1 to the third station STA3. At this time, the station around the access point receiving the MU-RTS frame sets a timer having the reference time as a duration and having the PPDU reception as a release condition. If the timer expires, the station around the access point resets the NAV setting. At this time, the reference time may be (2×aSIFSTime)+(CTS_Time)+aPHY-RX-START-Delay+(n×aSlotTime) described above. Also, the release condition may be a PPDU reception including a CTS frame that is a response to an MU-RTS frame.

The access point receives simultaneous CTS frames from the first station STA1 to the third station STA3 and transmits a trigger frame to the first station STA1 to the third station STA3. At this time, the wireless communication terminal around the access point receiving the MU-RTS frame releases the timer based on the transmission of the trigger frame of the access point. Therefore, the NAV setting of the station around the access point that receives the MU-RTS frame is maintained.

As described with reference to FIGS. 9 to 10, when determining whether to reset the NAV according to whether the wireless communication terminal receiving the MU-RTS frame and setting the NAV receives the PPDU within the reference time from when receiving the MU-RTS frame, the legacy wireless communication terminal may not reset the NAV. Specifically, the legacy wireless communication terminal may decode the MAC header of the MU-RTS frame and set the NAV according to the duration field of the MAC header. However, the legacy wireless communication terminal does not reset the NAV if the PPDU is not received for the reference time after receiving the MU-RTS frame. Therefore, even if the embodiment described with reference to FIGS. 9 to 10 is followed, a problem arises that the NAV set in the legacy wireless communication terminal may not be reset. In order to solve this problem, the wireless communication terminal may transmit the CF-END frame.

Figure 11:
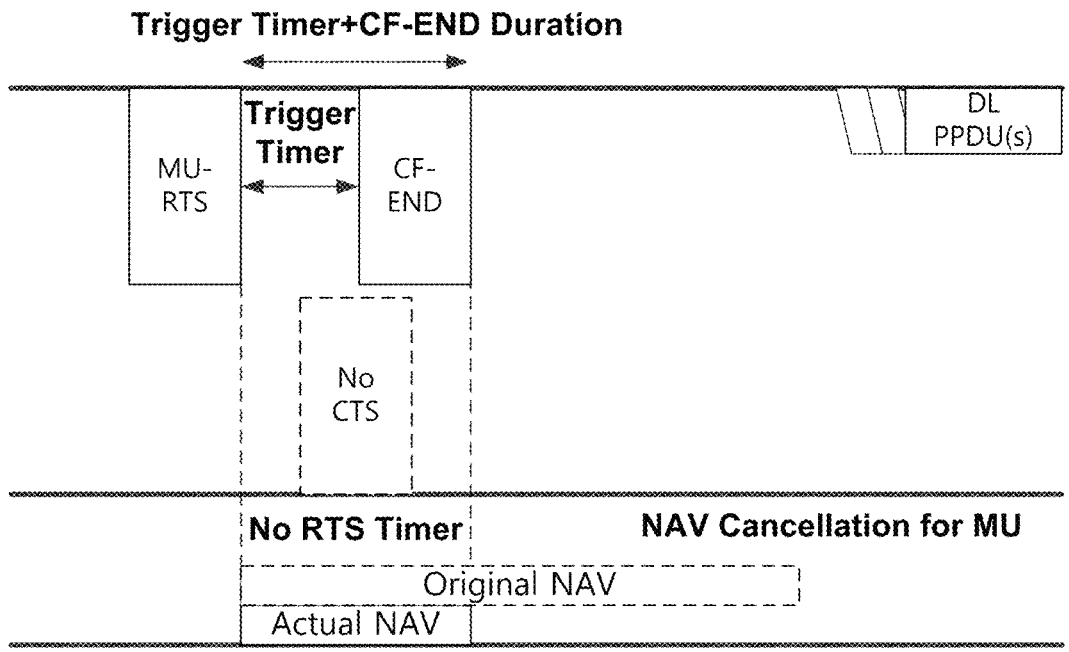
FIG. 11 shows that a wireless communication terminal according to an embodiment of the present invention transmits a CF-END frame to reset a NAV set in a neighboring wireless communication terminal.

FIG. 11 shows that a wireless communication terminal according to an embodiment of the present invention transmits a CF-END frame to reset a NAV set in a neighboring wireless communication terminal.

If the first wireless communication terminal fails to receive the PPDU for the reference time from when the MU-RTS frame is transmitted, the first wireless communication terminal may transmit the CF-END frame. At this time, the reference time may be a value determined based on a transmission interval between the MU-RTS frame and the CTS frame. Specifically, the reference time may be SIFS+n×Time_slot. Here, n is a natural number. In a specific embodiment, n is 1 and the reference time may be PIFS. Also, n may be 2.

Specifically, when the first wireless communication terminal fails to receive a PPDU including a CTS frame or a simultaneous CTS frame for a reference time from when the MU-RTS frame is transmitted, the first wireless communication terminal may transmit the CF-END frame.

The wireless communication terminal receiving the CF-END frame may reset the NAV setting based on the TA field of the CF-END frame. Specifically, the wireless communication terminal receiving the CF-END frame resets the NAV setting when the value of the TA field of the CF-END frame is equal to the BSSID of the BSS associated with the wireless communication terminal receiving the CF-END frame.

Also, the operation of the first wireless communication terminal may be same with the operation of the wireless communication terminal transmitting the CF-END frame for terminating the TXOP in the legacy wireless LAN system. Specifically, the first wireless communication terminal may not access the radio resource during the existing NAV time set before the NAV reset through the transmission of the CF-END frame. However, when the first wireless communication terminal resets the NAV for data transmission to the plurality of second wireless communication terminals by the CF-END frame, the first wireless communication terminal may perform channel contention with other terminals even before the NAV set before the NAV reset after the CF-END transmission ends.

When the first wireless communication terminal transmits the CF-END frame through the legacy PPDU, the legacy wireless communication terminal may decode the CF-END frame and release the NAV. Accordingly, the first wireless communication terminal may reset the NAV of the non-legacy wireless communication terminal and the legacy wireless communication terminal by transmitting the CF-END frame.

Also, according to a specific embodiment, the embodiments described with reference to FIGS. 9 to 10 and the CF-END frame transmission of the first wireless communication terminal may be used together.

In the embodiment of FIG. 11, the access point transmits an MU-RTS frame to a plurality of stations. At this time, the station around the access point receiving the MU-RTS frame sets the NAV based on the MU-RTS frame.

Further, the access point sets a timer having the reference time as a duration from when the MU-RTS frame is transmitted and having the PPDU reception as a release condition. When the timer expires, the access point transmits a CF-END frame. At this time, the reference time may be SIFS+n×Time_slot described above. Also, the release condition may be a PPDU reception including a CTS frame that is a response to an MU-RTS frame.

The access point does not receive a simultaneous CTS frame from a plurality of stations.

The access point transmits a CF-END frame when the timer expires. The station around the access point receiving the CF-END frame resets the NAV based on the CF-END frame.

The access point does not access the radio resource until the previously set NAV is terminated. The access point participates in the channel contention procedure after the previously set NAV ends.

NAV reset through CF-END transmission may be used not only for NAV setting through MU-RTS frame transmission but also for NAV setting through trigger frame. This will be described with reference to FIG. 12.

Figure 12:
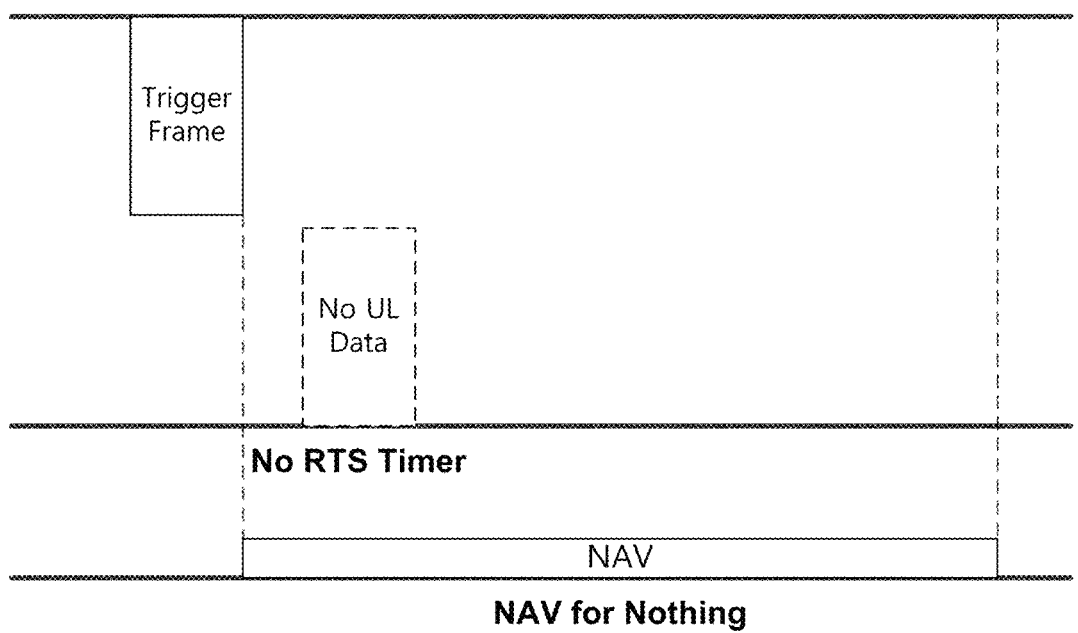
FIG. 12 shows that, when a wireless communication terminal according to an embodiment of the present invention does not receive data after transmitting a trigger frame, a wireless communication terminal around the wireless communication terminal that transmits the trigger frame maintains the NAV setting.

FIG. 12 shows that, when a wireless communication terminal according to an embodiment of the present invention does not receive data after transmitting a trigger frame, a wireless communication terminal around the wireless communication terminal that transmits the trigger frame maintains the NAV setting.

In the embodiment of FIG. 12, the first wireless communication terminal transmits a trigger frame. The wireless communication terminal around the first wireless communication terminal that receives the trigger frame sets the NAV based on the trigger frame. Specifically, the wireless communication terminal around the first wireless communication terminal that receives the trigger frame sets the NAV according to the duration field of the trigger frame.

The first wireless communication terminal fails to receive data from the plurality of second wireless communication terminals. Even if no data transmission occurs in this manner, the wireless communication terminal around the first wireless communication terminal that receives the trigger frame maintains the NAV setting set by the trigger frame. Therefore, the first wireless communication terminal that transmits the trigger frame also needs to reset the NAV setting of the peripheral wireless communication terminal through the CF-END frame. This will be described with reference to FIGS. 13 to 14.

Figure 13:
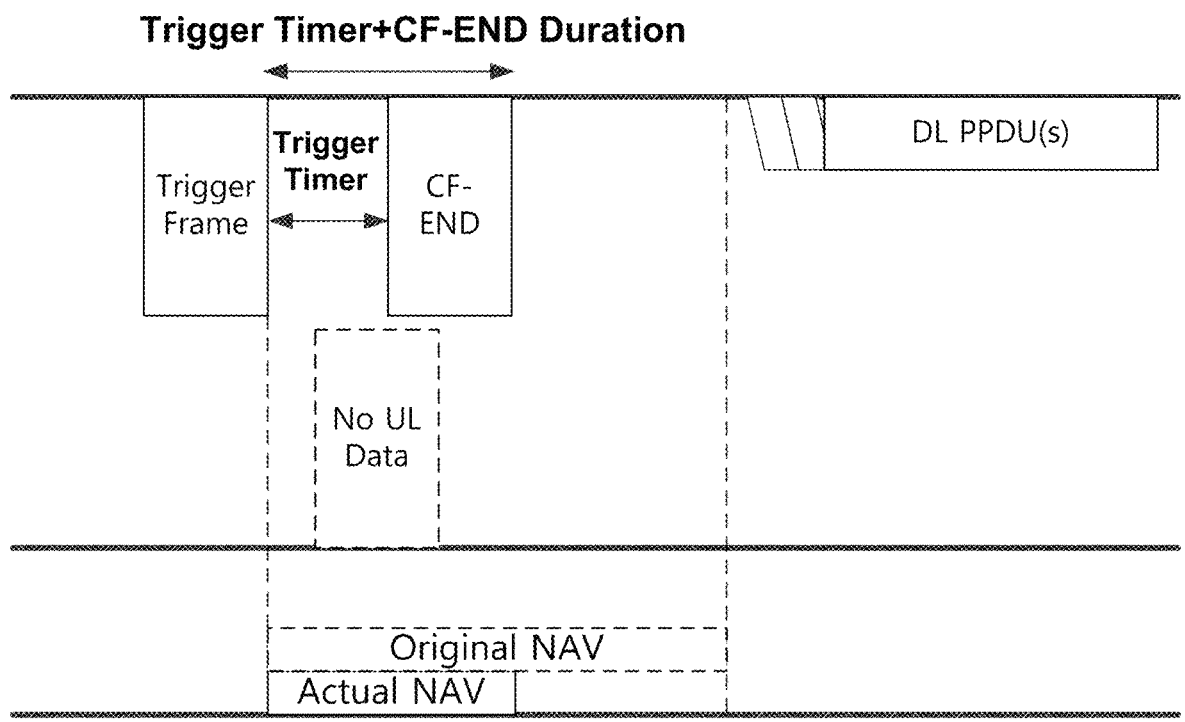
FIG. 13 shows that a wireless communication terminal according to an embodiment of the present invention transmits a trigger frame and then transmits a CF-END frame to reset a NAV set in a neighboring wireless communication terminal.
Figure 14:
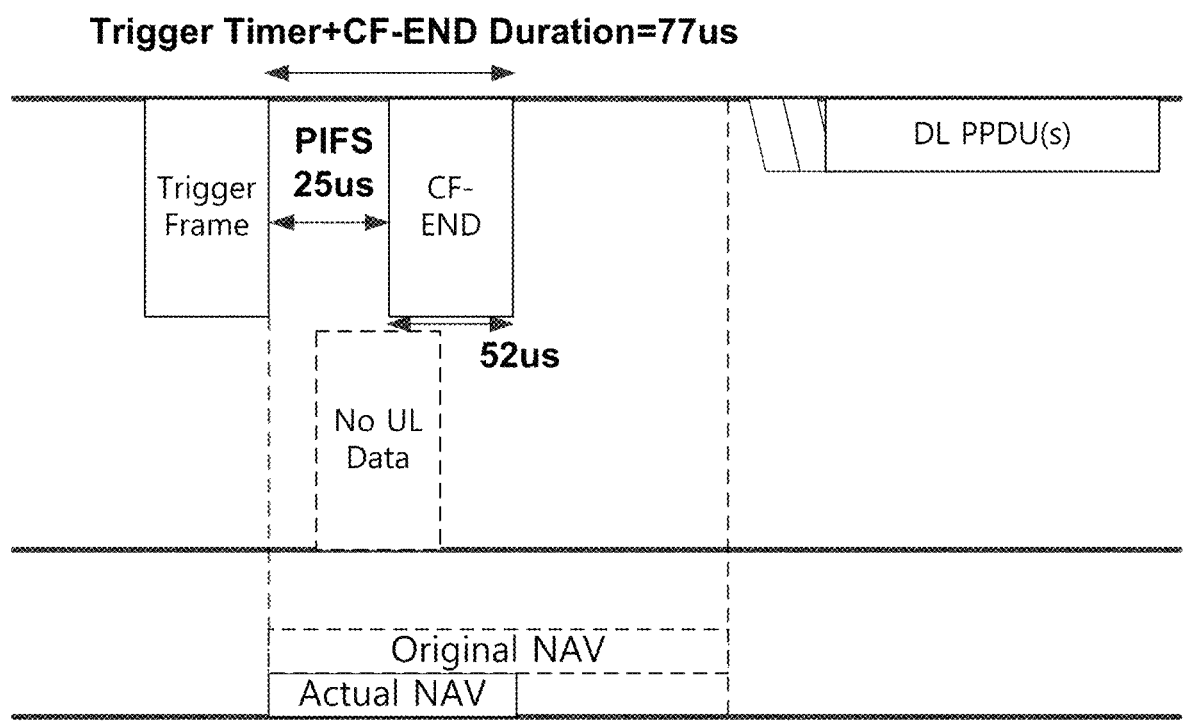
FIG. 14 shows a time required for resetting the NAV set in the neighboring wireless communication terminal by transmitting the CF-END frame after the wireless communication terminal transmits the trigger frame according to the embodiment of the present invention.

FIG. 13 shows that a wireless communication terminal according to an embodiment of the present invention transmits a trigger frame and then transmits a CF-END frame to reset a NAV set in a neighboring wireless communication terminal. FIG. 14 shows a time required for resetting the NAV set in the peripheral wireless communication terminal by transmitting the CF-END frame after the wireless communication terminal transmits the trigger frame according to the embodiment of the present invention.

If the first wireless communication terminal fails to receive the PPDU for the reference time from when the trigger frame is transmitted, the first wireless communication terminal may transmit the CF-END frame. At this time, the reference time may be a value determined based on a transmission interval between the trigger frame and the CTS frame. Specifically, the reference time may be SIFS+n× Time_slot. Here, n is a natural number. In a specific embodiment, n is 1 and the reference time may be PIFS. Also, n may be 2.

Specifically, when the first wireless communication terminal fails to receive the PPDU including the data for the reference time from the transmission of the trigger frame, the first wireless communication terminal may transmit the CF-END frame.

Also, even if the first wireless communication terminal fails to receive the PPDU for the reference time from the transmission of the trigger frame, the first wireless communication terminal may not transmit the CF-END frame if the set NAV time is smaller than the reference value. At this time, the reference value may be determined based on a reference time which is a condition for CF-END frame transmission and a time required for CF-END frame transmission. Specifically, the reference value may be a sum of a reference time that is a condition for CF-END frame transmission and a time required for CF-END frame transmission. If the set NAV time is less than the sum of the reference time and the CF-END frame transmission time, the time required to transmit the CF-END may be longer than the remaining duration of the NAV.

Also, the first wireless communication terminal may transmit the CF-END frame using a Modulation & Coding Scheme (MCS) that is more robust than the trigger frame.

In the embodiment of FIG. 14, the first wireless communication terminal modulates the CF-END frame with an MCS0 and transmits the CF-END frame. At this time, the reference time which is a condition for transmission of the CF-END frame is PIFS. At this time, the first wireless communication terminal may transmit the CF-END frame and reset the NAV of the wireless communication terminal around the first wireless communication terminal set by the trigger frame.

Figure 15:
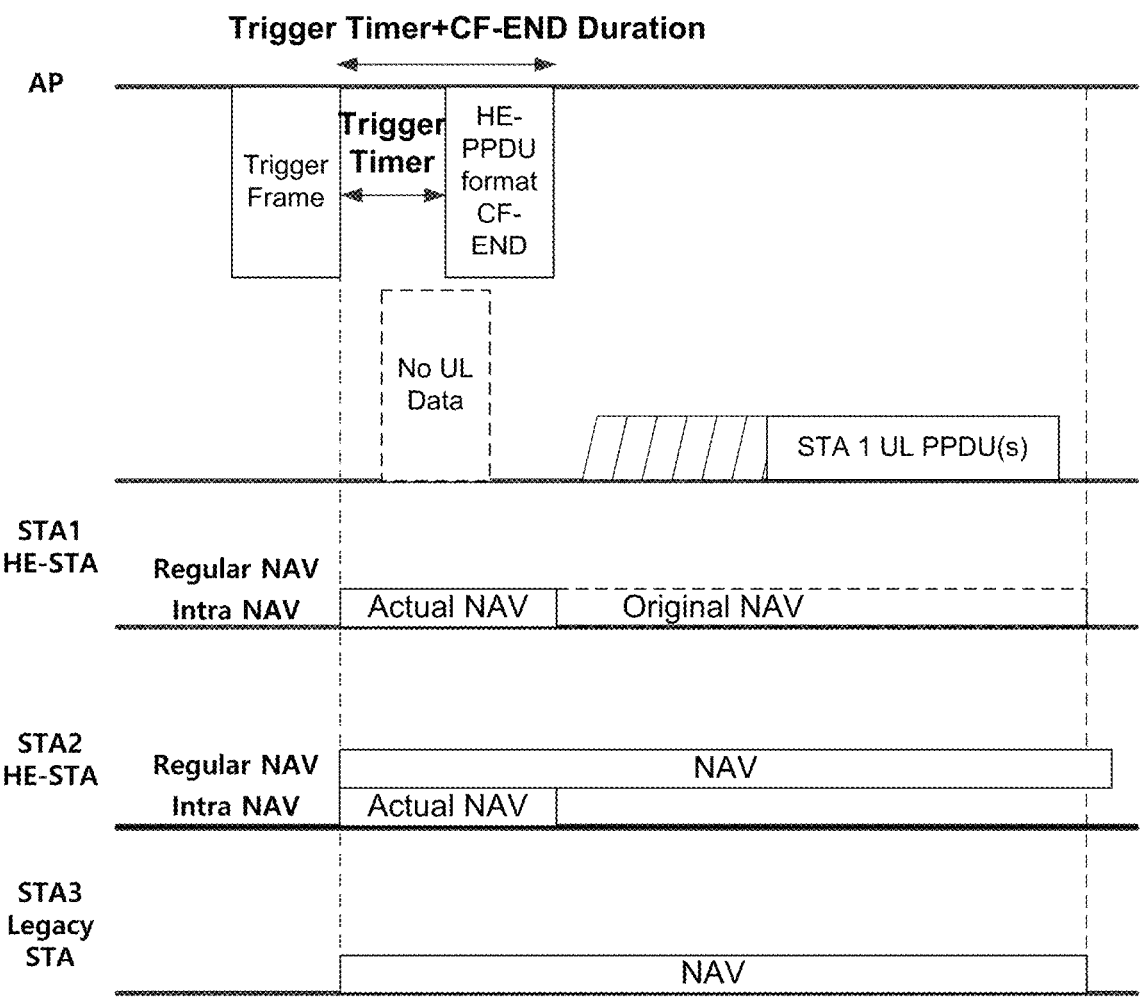
FIG. 15 shows that a wireless communication terminal according to the embodiment of the present invention transmits a CF-END frame in the HE-PPDU format to reset the NAV of a neighboring wireless communication terminal.

FIG. 15 shows that a wireless communication terminal according to the embodiment of the present invention transmits a CF-END frame in the HE-PPDU format to reset the NAV of a peripheral wireless communication terminal.

The first wireless communication terminal may select any one of the plurality of PPDU formats and transmit the CF-END frame. Specifically, the first wireless communication terminal may transmit a CF-END frame in a legacy PPDU format. Also, the first wireless communication terminal may transmit the CF-END frame in a non-legacy PPDU format. When the first wireless communication terminal transmits the CF-END frame of the legacy PPDU format, the first wireless communication terminal may reset all the NAVs of the legacy wireless communication terminal and the non-legacy wireless communication terminal. However, when the first wireless communication terminal transmits the CF-END frame of the legacy PPDU format, the first wireless communication terminal also resets the NAV of the legacy wireless communication terminal. When the first wireless communication terminal transmits the CF-END frame in the non-legacy PPDU format, it may reset only the NAV setting of the non-legacy wireless communication terminal. Therefore, the first wireless communication terminal may reset the NAV setting of the non-legacy wireless communication terminal without resetting the NAV setting of the legacy wireless communication terminal.

In the embodiment of FIG. 15, an access point AP, a first station STA1 which is a non-legacy station, and a second station STA2 which is a non-legacy station are associated with the same BSS. At this time, it is assumed that the third station STA3, which is a legacy station, is not associated with the corresponding BSS.

The access point AP transmits a trigger frame to a plurality of stations in the BSS. At this time, the first station STA1 to the second station STA2 do not correspond to the destination address of the trigger frame. The first to third stations STA1 to STA3 around the access point AP set the NAV based on the trigger frame. Specifically, the first station STA1 and the second station STA2, which are non-legacy stations in the BSS, set an intra NAV indicating a NAV for the BSS to which the station belongs based on the trigger frame.

No uplink transmission data UL Data is transmitted to the access point AP during the reference time (Trigger Timer) from when the access point AP transmits the trigger frame.

Therefore, the access point AP transmits the CF-END frame. At this time, the access point AP transmits a CF-END frame in HE-PPDU format which is a non-legacy PPDU format.

The first station STA1 and the second station STA2, which are non-legacy stations, receive the CF-END frame, decode the CF-END frame, and reset the intra NAV indicating the NAV of the BSS to which the first station STA1 and the second station STA2 are associated. At this time, the third station STA3 maintains a regular NAV indicating the NAV for the BSS to which the third station STA3 is not associated, as before the reception of the CF-END frame.

Since the third station STA3, which is a legacy station, is not able to decode the CF-END frame in the HE-PPDU format, the third station STA3 maintains the existing NAV setting.

Through this operation, the first wireless communication terminal may selectively reset the NAV of the non-legacy wireless communication terminal.

Figure 16:
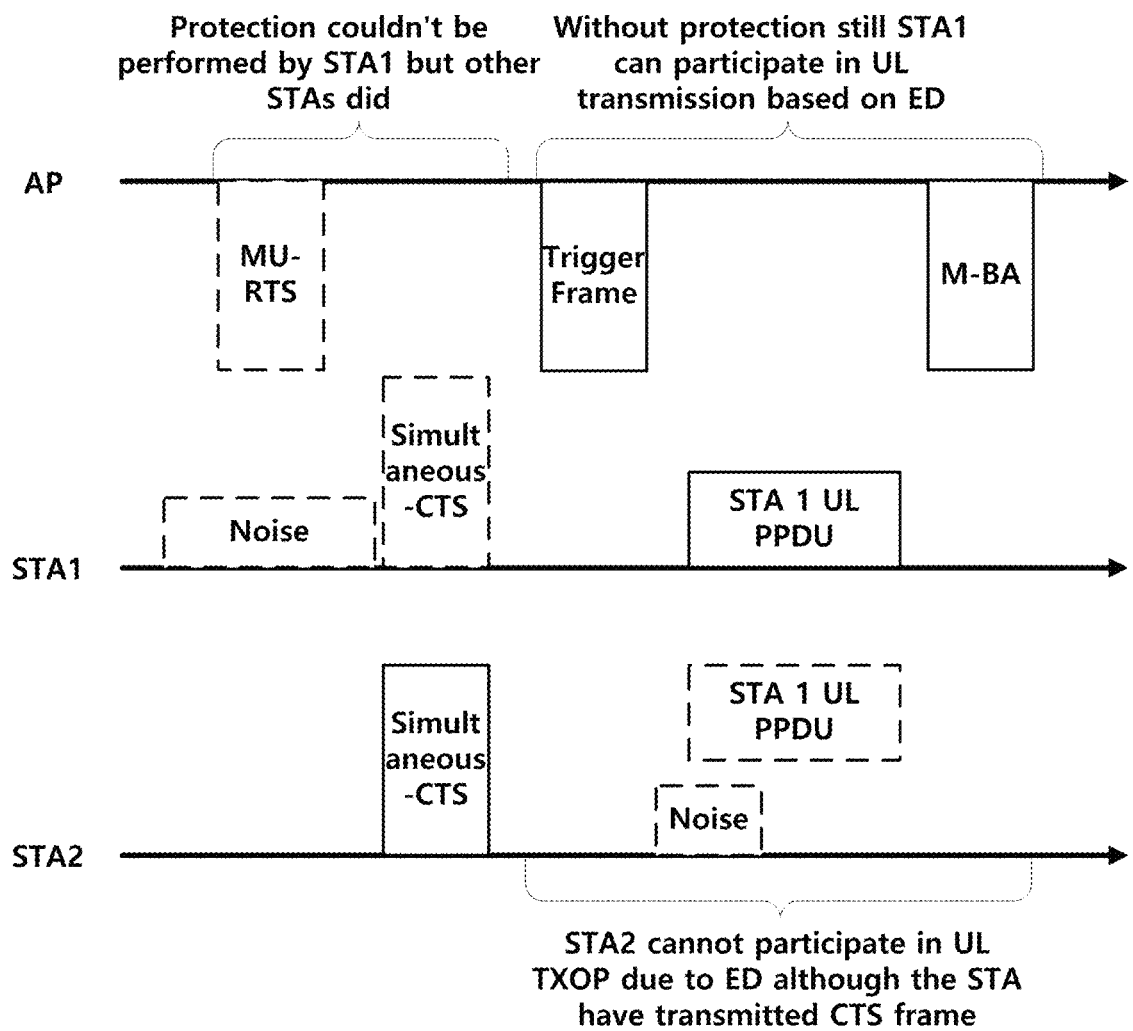
FIG. 16 shows that a wireless communication terminal according to an embodiment of the present invention performs channel sensing based on a trigger frame.

FIG. 16 shows that a wireless communication terminal according to an embodiment of the present invention performs channel sensing based on a trigger frame.

In the unlicensed wireless communication band, the wireless communication terminal obtains Transmission Opportunity (TXOP) through a contention procedure. The wireless communication terminal may access a wireless medium within the obtained TXOP without a separate contention procedure. However, channel sensing may be required when a plurality of wireless communication terminals simultaneously transmit data through OFDMA or the like. For this, the trigger frame may include information on channel sensing. Specifically, the channel sensing information may indicate whether the second wireless communication terminal receiving the trigger frame is required to perform channel sensing on the frequency band allocated to the second wireless communication terminal before transmitting the trigger frame to the first wireless communication terminal. Specifically, the channel sensing information may be a channel sensing bit indicating whether the second wireless communication terminal is required to perform channel sensing. Also, the channel sensing may indicate an energy detection (ED) for determining whether a signal is detected in a specific frequency band.

The first wireless communication terminal may set the channel sensing bit based on at least one of the length of the PPDU to be transmitted by the second wireless communication terminal and whether the PPDU to be transmitted by the second wireless communication terminal includes the ACK information. When the length of the PPDU to be transmitted by the second wireless communication terminal is longer than the reference length, the first wireless communication terminal may set a channel sensing bit to perform channel sensing. In addition, if the PPDU to be transmitted by the second wireless communication terminal does not include ACK information, the first wireless communication terminal may set a channel sensing bit to perform channel sensing. In addition, if the PPDU to be transmitted by the second wireless communication terminal includes ACK information and the length of the PPDU is less than the reference length, the first wireless communication terminal may set a channel sensing bit so as not to perform channel sensing.

When the second wireless communication terminal performs the channel sensing of the second wireless communication terminal before the transmission to the first wireless communication terminal, the second wireless communication terminal may transmit data to the second wireless communication terminal independently of the MU-RTS frame reception success and the simultaneous CTS frame transmission success. Even if the first wireless communication terminal receives the simultaneous CTS, the first wireless communication terminal may not distinguish the second wireless communication terminal that transmits the simultaneous CTS. Accordingly, the first wireless communication terminal may transmit the trigger frame for allocating the radio resource to the second wireless communication terminal irrespective of whether or not the second wireless communication terminal transmits the simultaneous CTS frame. In addition, the frequency resource situation may be changed when data is transmitted from the second wireless communication terminal. Therefore, a second wireless communication terminal that does not transmit a simultaneous CTS frame needs to transmit data to the first wireless communication terminal through a frequency band allocated through a trigger frame based on channel sensing.

As in the embodiment of FIG. 16, the access point AP transmits an MU-RTS frame to the first station STA1 and the second station STA2.

The first station STA1 fails to receive the MU-RTS frame due to the surrounding noise. Therefore, the first station STA1 does not transmit the simultaneous CTS frame to the access point AP.

The second station STA1 receives the MU-RTS frame. The second station STA2 transmits a simultaneous CTS frame to the access point AP.

The access point AP transmits a trigger frame to the first station STA1 and the second station STA2. At this time, the trigger frame includes channel sensing information indicating that channel sensing of the station is required.

The first station STA1 does not transmit the simultaneous CTS frame to the access point AP but transmits data to the access point AP based on the trigger frame. At this time, the first station STA1 channel-senses the frequency band allocated to the first station STA1, detects that the corresponding frequency band is idle, and transmits data to the access point AP.

Since the second station STA2 transmits a simultaneous CTS frame to the access point AP but the frequency band allocated to the second station STA2 is being used by another station at the time point at which data is to be transmitted, the second station STA2 does not transmit data to the access point AP. Specifically, the second station STA2 channel-senses a frequency band allocated to the second station STA2. Through this, the second station STA2 detects that the corresponding frequency band is busy and does not transmit data to the access point AP.

Figure 17:
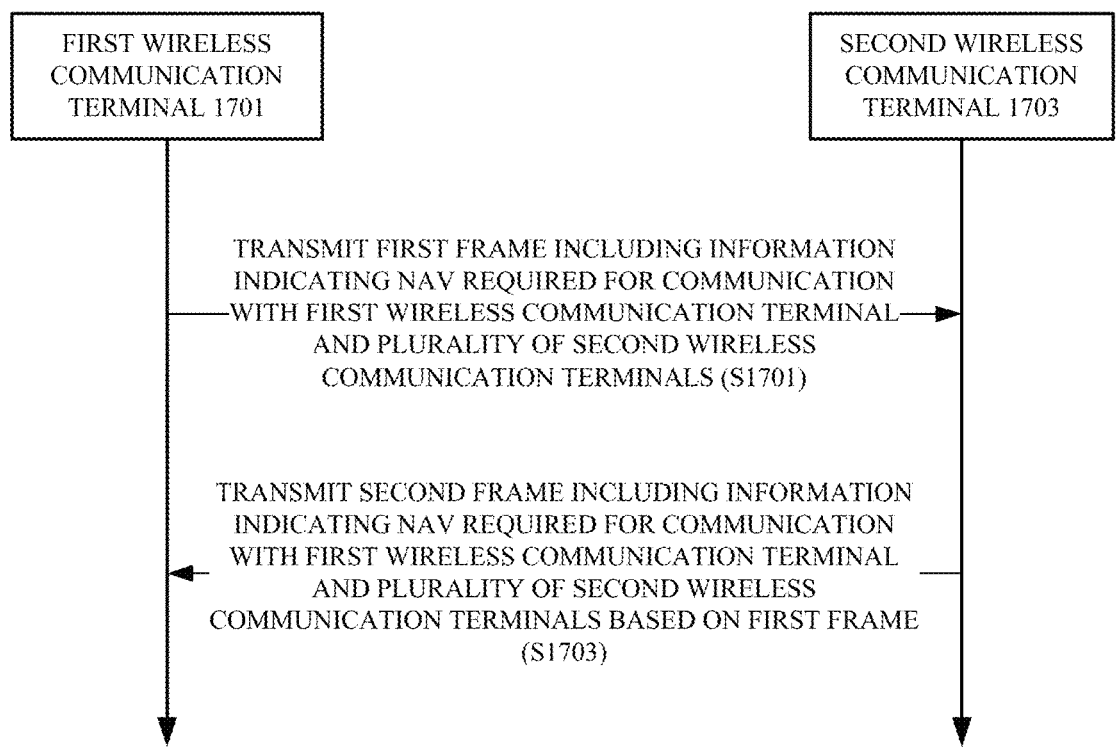
FIG. 17 shows the operation of a wireless communication terminal according to an embodiment of the present invention.

FIG. 17 shows the operation of a wireless communication terminal according to an embodiment of the present invention.

The first wireless communication terminal 1701 transmits to the plurality of second wireless communication terminals 1703 a first frame including duration information indicating a duration required for the pending transmission sequence of the first wireless communication terminal 1701 and the plurality of second wireless communication terminals 1703 (S1701). At this time, the first frame may be the trigger frame described above. Also, the first frame may be the MU-RTS frame described above.

When another wireless communication terminal other than the plurality of second wireless communication terminals 1703 receives the first frame, the another wireless communication terminal sets a NAV based on the first frame.

The second wireless communication terminal 1703 transmits a second frame including duration information indicating a duration required for the pending transmission sequence of the first wireless communication terminal 1701 and the plurality of second wireless communication terminals 1703 (S1703).

When the first wireless communication terminal 1701 fails to receive the PPDU for the first reference time from the time when transmitting the first frame, the first wireless communication terminal 1701 may transmit a third frame. At this time, the third frame may be a CF-END frame. In addition, the first reference time may be determined based on the first frame and the transmission interval of the second frame received in response to the first frame. If the first frame is a trigger frame, the first reference time may be SIFS+n×Time_slot. Here, n is a natural number. In a specific embodiment, n is 1 and the first reference time may be PIFS. Also, n may be 2. Also, if the first reference frame is an MU-RTS frame, the first reference time may be SIFS+n× Time_slot. Here, n is a natural number. In a specific embodiment, n is 1 and the first reference time may be PIFS. Also, n may be 2.

Also, the first wireless communication terminal 1701 may not transmit the third frame if the remaining duration of the NAV is smaller than the second reference time. At this time, the second reference time may be determined based on the first reference time and the time required for transmission of the third frame. Specifically, the second reference time may be a sum of a first reference time and a transmission time of the third frame.

Through the third frame transmission, the first wireless communication terminal 1701 may reset the NAV set in the wireless communication terminal around the first wireless communication terminal 1701 by the first frame.

The first wireless communication terminal 1701 may select a PPDU format from among a plurality of PPDU formats and transmit the third frame. Specifically, the first wireless communication terminal 1701 may transmit a third frame in a legacy PPDU format. In another specific embodiment, the first wireless communication terminal 1701 may transmit a third frame in a non-legacy PPDU format. The specific operation in which the first wireless communication terminal 1701 transmits the third frame may be the same as the embodiment described with reference to FIGS. 11 to 15.

In addition, if the wireless communication terminal around the first wireless communication terminal 1701 receiving the first frame and setting the NAV fails to receive the PPDU during the third reference time from the time of receiving the first frame, the wireless communication terminal may reset the NAV. At this time, the third reference time may be (2×aSIFSTime)+(CTS_Time)+aPHY-RX- START-Delay+(n×aSlotTime). aSIFSTime represents the time of the SIFS defined in the IEEE 802.11 standard. aSlotTime represents the Slot Time defined in the IEEE 802.11 standard. CTS_Time indicates a duration required for CTS frame transmission. aPHY-RX-START-Delay represents the time from the start time point of the preamble until the RX-START.indication is issued in the physical layer. Also, n is a natural number. In a specific embodiment, n may be 2.

Data transmission or data reception of the first wireless communication terminal 1701 may be protected through the NAV set through the first frame. Specifically, after the NAV is set in the neighboring wireless communication terminal, the first wireless communication terminal 1701 may transmit data to the plurality of second wireless communication terminals 1703. In another specific embodiment, after the NAV is set in the peripheral wireless communication terminal, the first wireless communication terminal 1701 may transmit the trigger frame to the plurality of second wireless communication terminals 1703, and the plurality of second wireless communication terminals 1703 may transmit data to the first wireless communication terminal 1701 based on the trigger frame.

In addition, the first wireless communication terminal may set channel sensing information as in the embodiment described with reference to FIG. 16 when transmitting a trigger frame. At this time, the second wireless communication terminal 1703 may transmit data to the first wireless communication terminal 1701 independently of the MU-RTS frame reception success and the simultaneous CTS frame transmission success.

Although the present invention is described by using wireless LAN communication as an example, it is not limited thereto and may be applied to other communication systems such as cellular communication. Additionally, while the method, device, and system of the present invention are described in relation to specific embodiments thereof, some or all of the components or operations of the present invention may be implemented using a computer system having a general purpose hardware architecture.

The features, structures, and effects described in the above embodiments are included in at least one embodiment of the present invention and are not necessary limited to one embodiment. Furthermore, features, structures, and effects shown in each embodiment may be combined or modified in other embodiments by those skilled in the art. Therefore, it should be interpreted that contents relating to such combination and modification are included in the range of the present invention.

While the present invention is described mainly based on the above embodiments but is not limited thereto, it will be understood by those skilled in the art that various changes and modifications are made without departing from the spirit and scope of the present invention. For example, each component specifically shown in the embodiments may be modified and implemented. It should be interpreted that differences relating to such modifications and application are included in the scope of the present invention defined in the appended claims.

The invention claimed is:

1. A wireless communication terminal comprising:
a transceiver; and
a processor,
wherein the processor is configured to:
receive, from a base wireless communication terminal through the transceiver, a first frame including a duration field indicating a duration required for a pending frame exchange sequence and first information indicating a frequency band which is allocated for transmission of a second frame, wherein the pending frame exchange sequence is a transmission sequence between one or more wireless communication terminals and the base wireless communication terminal,
set a network allocation vector (NAV) according to the duration for the pending frame exchange sequence, and
reset the NAV when the wireless communication terminal does not receive a PLCP Protocol Data Unit (PPDU) for a reference time from a time point at which the first frame is received,
wherein the reference time is set based on a Modulation & Coding Scheme (MCS), with which the second frame is transmitted, an inter-frame space between the first frame and the second frame, and a Slot Time defined in an IEEE 802.11 standard,
wherein the MCS with which the second frame is transmitted is the most robust MCS usable for a transmission of a PPDU including the second frame,
wherein the second frame is a response to the first frame.

2. The wireless communication terminal of claim 1, wherein the most robust MCS usable for the transmission of the PPDU including the second frame represents the lowest data rate among data rates usable for the transmission of the PPDU including the second frame.

3. The wireless communication terminal of claim 2, wherein the MCS with which the second frame is transmitted is MCS0 defined in the IEEE 802.11 standard.

4. The wireless communication terminal of claim 1, wherein the reference time is set by a following equation, $$T_{ref} = (2 \times aSIFSTime) + (SecondFrame\_Time) + aPHY\text{-}RX\text{-}START\text{-}Delay + (2 \times aSlotTime)$$

where $T_{ref}$ denotes the reference time,
where aSIFSTime denotes a time of a Short Inter-Frame Space (SIFS) defined in the IEEE 802.11 standard,
where SecondFrame_Time denotes a duration required for transmission of the second frame which is transmitted by MCS0,
where aPHY-RX-START-Delay denotes a time from a start time point of a preamble until the RX-START.indication is issued in a physical layer of the wireless communication terminal,
aSlotTime denotes the Slot Time defined in the IEEE 802.11 standard.

5. The wireless communication terminal of claim 1, wherein the first frame includes second information indicates identifiers of the one or more of the wireless communication terminal,
wherein the processor is configured to reset the NAV when the second information does not indicate the wireless communication terminal.

6. The wireless communication terminal of claim 1, wherein the processor is configured to reset the NAV when the wireless communication terminal receives a third frame.

7. The wireless communication terminal of claim 1, wherein the processor is configured to participate in a channel contention procedure after at a time the NAV is reset.

8. A method of operating a wireless communication terminal, the method comprising:
receiving, from a base wireless communication terminal, a first frame including a duration field indicating a duration required for a pending frame exchange sequence and first information indicating a frequency band which is allocated for transmission of a second frame, wherein the pending frame exchange sequence is a transmission sequence between one or more wireless communication terminals and the base wireless communication terminal, setting a network allocation vector (NAV) according to the duration for the pending frame exchange sequence, and resetting the NAV when the wireless communication terminal does not receive a PLCP Protocol Data Unit (PPDU) for a reference time from a time point at which the first frame is received, wherein the reference time is set based on a Modulation & Coding Scheme (MCS), with which the second frame is transmitted, and an inter-frame space between the first frame, the second frame, and a Slot Time defined in a IEEE 802.11 standard, wherein the MCS with which the second frame is transmitted is the most robust MCS usable for a transmission of a PPDU including the second frame, wherein the second frame is a response to the first frame.

9. The method of claim 8, wherein the most robust MCS usable for the transmission of the PPDU including the second frame represents the lowest data rate among data rates usable for the transmission of the PPDU including the second frame.

10. The method of claim 8, wherein the MCS is MCS0 defined in the IEEE 802.11 standard.

11. The method of claim 8, wherein the reference time is set by a following equation, $$T_{ref}=(2\times aSIFSTime)+(SecondFrame\_Time)+aPHY\text{-}RX\text{-}START\text{-}Delay+(2\times aSlotTime)$$

where $T_{ref}$ denotes the reference time, where aSIFSTime denotes a time of the Short Inter-Frame Space (SIFS) defined in the IEEE 802.11 standard, where SecondFrame_Time denotes a duration required for transmission of the second frame which is transmitted by MCS0, where aPHY-RX-START-Delay denotes a time from a start time point of the preamble until the RX-START.indication is issued in a physical layer of the wireless communication terminal, aSlotTime denotes the Slot Time defined in the IEEE 802.11 standard.

12. The method of claim 8, wherein the first frame includes second information indicates identifier of the one or more of the wireless communication terminal, wherein the resetting the NAV comprises resetting the NAV when the second information does not indicate the wireless communication terminal.

13. The method of claim 8, wherein the resetting the NAV comprises resetting when the wireless communication terminal receives a third frame.

14. The method of claim 8, wherein the method further comprises participating in a channel contention procedure after at a time the NAV is reset.

* * * * *